Patented May 26, 1953

2,640,080

UNITED STATES PATENT OFFICE 2,640,080

PREPARATION OF PRIMARY DIAMINES

De Los F. De Tar, Ithaca, and Charles J. Le Pome, Kenmore, N. Y., assignors to E. I. du Pont de Nemours & Company, Wilmington, Del., a corporation of Delaware No Drawing. Application October 18, 1947, Serial No. 780,762

8 Claims. (Cl. 260—570.9)

This invention is concerned with a process for the preparation of primary diamines from highly reactive organic dihalides.

Numerous processes for the production of amines from organic halides have been proposed heretofore. Most of these processes involved the reaction of the halide with an excess of an aqueous solution of ammonia, and, in general, complex mixtures of amines were thus obtained. The preparation of primary diamines by such processes has been possible, however, only when the dihalide reactant was so chosen that it reacted rather slowly with primary amines. Thus, in U. S. Patent 1,832,534, Curme et al. have described a process for the production of ethylene diamine from a dihalide of relatively low reactivity (ethylene dichloride), and aqueous ammonia. In the latter process, the reaction could be stopped at the primary diamine stage, and the formation of excessive amounts of secondary and tertiary amines, which are polymeric, could be avoided.

Attempts to carry out similar processes employing reactive allyl or benzyl type dihalides, e. g. 1,4 - dibromobutene - 2 - and $a,a'$-dichloro-p-xylene, respectively, have been entirely unsuccessful heretofore. These organic dihalides, having the allylic structure, react rapidly with primary amines, and the formation of primary amines in satisfactory yields from these reactive dihalides and ammonia therefore has not been possible in the past. In fact, it has been found, as disclosed in the Martin Patent U. S. 2,334,782, that these reactive dihalides are converted in excellent yields to disecondary diamines when heated with a very large excess of primary alkylamine under anhydrous conditions. In the reaction of ammonia with these reactive dihalides, it is therefore evident that, if the reaction took the expected course, any primary amine which might be formed would be converted largely to disecondary diamine, and the supply of primary amine, which is thus consumed, would be replenished by the reaction of ammonia with the dihalide. The net result would be the conversion of dihalide to amines other than the simple di-primary diamines. Indeed, it has been found that the reaction takes this expected course; this is illustrated in Table I, which shows the low yields of primary amine obtained from a mixture of anhydrous ammonia and $a,a'$-dichloro-p-xylene, when the mol ratio of NH₃:dihalide is below about 50:1.

In accordance with the present invention it has been discovered, however, that while the amination gives poor yields of diprimary diamine (e. g., $a,a'$-diamino-p-xylene) when the initial mol ratio of ammonia:dihalide is as high as about 50:1, the reaction takes an entirely unexpected and unpredictable turn when the initial mol ratio of ammonia:dihalide exceeds about 100:1. At these higher NH₃:dihalide mol ratios, and especially at mol ratios above 250:1, the ammonolysis yields the diprimary diamine (or hydrohalide thereof) as the chief reaction product rather than disecondary diamine. Excellent yields are obtained when the initial mol ratio is within the range of 500:1 to 1000:1. This also is illustrated in Table I.

TABLE I

*Reaction of $a,a'$-dichloro-p-xylene with ammonia at 30° C.*

[Reaction time, 70 minutes.]

| Mol Ratio NH₃/Dichloride | Wt. Dichloride (grams) | Vol. of Benzene Solvent (cc.) | Percent Yield of $\alpha, \alpha'$-Diamino-p-Xylene |
|---|---|---|---|
| 20 | 1.0 | 10 | Less than 10%. |
| 50 | 1.0 | 10 | Do. |
| 100 | 1.0 | 10 | 46. |
| 150 | 1.0 | 10 | 56. |
| 250 | 1.0 | 10 | 75. |
| 500 | 1.0 | 10 | 82. |
| 1,200 | 1.0 | 10 | 84. |

It is known, as disclosed in U. S. Patents 2,411,141 and 2,411,142, that di(chloromethyl)-substituted aromatic hydrocarbons are rapidly resinified upon contact with even relatively small amounts of ammonia. Therefore, it would have been expected that these dihalides would be converted to resinous products almost instantaneously when subjected to the action of relatively large amounts of ammonia. Obviously, therefore, these earlier patents did not suggest any method for obtaining high yields of diprimary diamines from the said dihalides, or for avoiding the formation of excessive amounts of resinous products when these dihalides were brought into contact with ammonia.

An object of this invention is to prepare diprimary diamines in good yields from certain highly reactive organic dihalides by reaction with ammonia. This object is achieved according to the invention by reacting these organic dihalides, as hereinafter defined, with ammonia, the initial mol ratio of ammonia:dihalide being at least 250:1, and preferably 500:1 to 1200:1. Preferably the dihalide is disseminated throughout the reaction mixture, i. e. it should be either in solution or dispersed in the form of fine particles, e. g. particles which can pass through a 100 mesh sieve; suitably an inert organic solvent for the dihalide may be employed to assist in the solution and/or suspension of the said dihalide. Any convenient amount of inert organic solvent (e. g. any liquid aliphatic, cycloaliphatic or aromatic hydrocarbon, or any liquid aliphatic ether, etc.) may be employed for this purpose. The use of solvents is thus advantageous in certain instances, but is not absolutely necessary, and is not highly essential when the reaction is conducted at relatively low temperatures. At temperatures above the critical temperature of ammonia, solvents are generally employed, to keep the entire reaction mixture in the liquid phase.

In general, the temperature should be within the range of 0° to 200° C., preferably 20° to 100° C.

The minimum pressure generally employed in the process of this invention is that pressure sufficient to maintain the reactants in the liquid state at the desired temperature of reaction. This is preferable since the reaction does not appear to take place with acceptable yields in the vapor phase. In the vicinity of room temperature and slightly above (e. g., 30° to 60° C.), which will normally be the preferred operating temperature, for reasons of economy, the pressure may be in the vicinity of 100 to 1,000 pounds per square inch, or higher. The maximum operating pressure is dependent mainly on economic factors, e. g. cost of construction, maintenance, etc.

For best results it is preferable to add the dihalide to the ammonia with rapid mixing, to avoid local high concentration of dihalide. The rate of addition of the dihalide to the liquid ammonia is not critical, especially if a solvent is employed. It may vary, as desired, from less than 1 minute to greater than 5 minutes. Actually, since the addition of the solution of the dihalide to the ammonia, in preferred embodiments, forms a homogeneous reaction mixture, the rate of the addition has little effect on the yield.

However, it is desirable that the rate at which the dihalide dissolves be faster than the rate at which it reacts with the ammonia. Therefore, while the use of a finely powdered dihalide results in excellent yields of primary amines, especially when very vigorous agitation is provided, the use of an organic solvent for the dihalide results in much faster dissemination and is, therefore, preferred, especially when the dihalide is a solid having a low solubility in liquid ammonia.

The dihalides which may be employed in the practice of the invention are characterized in that each of the halogen atoms is activated by a double bond between carbon atoms separated from the halogen atom by a methylene group, i. e. each of the halogens is combined in the form of a grouping having the structure

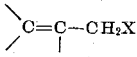

wherein X represents a halogen of the class consisting of chlorine and bromine. As a preferred class, the dihalo hydrocarbons having the above-defined structure may be employed, but substituted dihalohydrocarbons containing such groups as —O—, —S—, —O alkyl, —OC$_6$H$_5$, —N alkyl-CO-alkyl, —CON (alkyl)$_2$ and —CF$_3$, also give satisfactory results in the practice of the invention. Specific examples of such compounds are the di(halomethyl) benzenes, di(halomethyl) alkyl benzenes and di(halomethyl) alkoxybenzenes, such as α,α′-dibromo-p-xylene, 2,4-bis-(chloromethyl) toluene, 2,5-bis(chloromethyl)-p-xylene, 4,6-bis(chloromethyl)isodurene, 2,4-bis(chloromethyl) - 1,3,5 - triisopropyl benzene, 2,4-bis(chloromethyl) anisole, and 2,5-bis(chloromethyl) hydroquinone dimethyl ether; di(halomethyl) diphenyl oxides, such as 4,4′-bis(chloromethyl) diphenyl ether; di(halomethyl) diphenyl sulfides; 1,4-bis(chloromethyl) anthraquinone; and di(halomethyl) - polycyclic aromatic hydrocarbons, such as 2,7-bis(chloromethyl) fluorene, 2,7-bis(chloromethyl)-9,10-dihydrophenanthrene, 1,4 - bis(bromomethyl) naphthalene, 1,5 - bis(chloromethyl) napthalene, 9,10 - bis(chloromethyl) anthracene, and 4,4″-bis(chloromethyl)terphenyl, as well as the dichloro- and dibromo-alkenes having a double bond in the beta position with respect to each halogen atom, e. g. 1,4-dichloro-2-butene, 1,6-dichloro-2,4-hexadiene, and 1,8-dichloro-2,6-octadiene.

The invention may be further illustrated by means of the following examples.

*Example 1.—Preparation of α,α′-diamino-p-xylene*

The ammonolysis was carried out in a two-gallon capacity, jacketed, stainless steel autoclave with an anchor-type stirrer. Ammonia (7.16 lbs., 190 mols) was charged into the autoclave using a nitrogen pressure of 200 pounds per square inch. After adjusting the temperature of the jacket water to 40° C. the stirrer was started (90 R. P. M.) and 130 grams (0.74 mol) of pure α,α′-dichloro-p-xylene dissolved in 800 cc. of reagent grade benzene was forced into the autoclave under a nitrogen pressure of 40 to 50 pounds per square inch greater than the autoclave pressure (ammonia to dihalide mol ratio of 260). The addition required about 100 seconds and was accompanied by a pressure drop due to the cooling effect of the mixing of benzene and ammonia. After a reaction period of 45 minutes, the product was then worked up according to one of the following two procedures:

ISOLATION PROCEDURE I.—USE OF SODIUM HYDROXIDE

The liquid ammonia-benzene-reaction mixture was run out of the autoclave into a five liter flask. The ammonia was allowed to evaporate overnight and the benzene was removed by distillation, leaving a dry, light colored solid. The solid was taken up in water with a little sodium hydroxide, filtered to remove sediment and a sufficient amount of solid sodium hydroxide was added to salt out the diamine. The diamine layer was separated and the sodium hydroxide layer extracted with a 50:50 mixture of benzene and isopropyl alcohol. The diamine layer and the alcohol-benzene extract were combined, dried over sodium hydroxide pellets and the solvents removed by distillation. After the solvents had been removed, the crude diamine was filtered again and then distilled under a pressure of about 1 to 2 mm. The yields quoted are based on the weight of the diamine obtained at this point. Fractionation of the once distilled α,α′-diamino-p-xylene gave 90-95% recovery of constant boiling α,α′-diamino-p-xylene having a melting point of about 62° C.; boiling point 111°/2 mm. and a neutral equivalent of 68.5, calculated 68.1. The over-all yield of Example 1 of distilled α,α′-diamino-p-xylene by this process was 69%.

ISOLATION PROCEDURE II.—USE OF SODIUM ETHOXIDE

In this procedure, after the completion of the reaction, a 2 molar solution of 96% to 98% of the theoretical amount of sodium in absolute alcohol (sodium ethoxide solution) was run into the autoclave from a transfer cylinder. The use of a separate transfer cylinder and only 96% to 98% of the theoretical amount of sodium is designed to prevent the formation of $EtOCH_2C_6H_4CH_2NH_2$, which in making successive runs in the same vessel, is formed when an excess of EtONa is present. This ether cannot readily be separated from $a,a'$-diamino-p-xylene by distillation. The addition of the sodium ethoxide solution was accompanied by a pressure drop. The contents of the autoclave were discharged in a five liter, round-bottomed flask, the ammonia allowed to evaporate overnight, the salt removed by filtration and the solvents removed by distillation on a steam bath. The resulting 40% to 60% solution of crude diamine and alcohol and benzene was then subjected to distillation as described in the first procedure. The diamine obtained by these two methods was identical and by using this isolation procedure for Example 1 was obtained 72% yield. For both isolation procedures, in order to avoid decomposition of the crude diamine during the first distillation, it is preferred that a simple distillation rather than a fractionation be carried out at this point. The presence of alkali in the product during final distillation should be avoided since it tends to cause decomposition of the desired diamines.

Example 2.—$a,a'$-Diamino-p-xylene

Using the same apparatus as described in Example 1, ammonia was charged into the autoclave using a nitrogen pressure of 150 to 200 pounds per square inch. The stirrer was then started. $a,a'$-Dichloro-p-xylene dissolved in reagent grade benzene was forced into the autoclave under a nitrogen pressure of about 50 pounds per square inch greater than the autoclave pressure to give an ammonia to dihalide mol ratio of 560. At a jacket temperature of 38° C. the reaction time was 70 minutes. The product was then worked up according to isolation procedure No. II, to give a yield of 69%. Redistillation through a Vigreux column gave 40 grams of diamine, boiling point 93°/1 mm., neutral equivalent found 69.3, calculated 68.1.

Example 3.—1,4-diamino-2-butene

Using the procedure as outlined in Example 1, 760 grams of trans 1,4-dibromobutene-2 was converted to the diamine, using a reaction temperature of 37° C., a reaction time of 40 min., and a mol ratio of ammonia to dibromide of 270. Using isolation procedure No. I, a preliminary distillation fractionation gave 118 grams (38% yield) of diamine B. P., 102°/64.5 mm. The neutral equivalent was 43.8, calculated 43.1.

Example 4.—$a^1,a^5$-Diaminodurene $a^1,a^5$-Dichlorodurene was reacted with ammonia in the autoclave under conditions similar to those used for the preparation of $a,a'$-diamino-p-xylene. 150 grams (.75 mol) of $a^1,a^5$-dichlorodurene was dissolved in 500 cc. of benzene and placed in the autoclave. The stirrer was started and 7.92 lbs. of ammonia was then added (ammonia to dihalide mol ratio of 300). The autoclave was closed and the reaction continued for 12 hours at 40° C. As described in isolation procedure No. I, the ammonia was removed, alkali added and the solution was extracted with isopropyl alcohol. The solvent was removed at a reduced pressure and the residue, which crystallized, was distilled at 24 mm. This diamine had a boiling point of 176° to 180° C. and the yield was 48%. Considerable difficulty was experienced in distilling the diamine because of its high melting point (124° to 125° C.). However, after redistillation, a fraction with a neutral equivalent of 82.2 to 82.7 and a nitrogen analysis of 16.6 to 16.7% was obtained (calculated: neutral equivalent 82.13; nitrogen 17.0%).

Example 5.—$a^1,a^3$-Diamino-1,2,3,4,6-pentamethyl benzene

The ammonolysis of the dihalide was carried out as described in Example 4 using an ammonia to dihalide mol ratio of 300. 37% yield of the diamine was obtained. This compound has a boiling point of 152 to 153°/7 mm., a melting point of 74 to 75° C. and a neutralization equivalent of 89.7, calculated 89.1.

Example 6.—$a^1,a^4$-Diaminohexamethyl benzene

The dihalide was reacted with ammonia using the same ammonia to dihalide mol ratio and the same conditions as described in Example 4. A 41% yield of diamine with a boiling point if 171° to 178°/5 mm., melting point of 121° to 122° C. and a neutralization equivalent of 98.1, calculated 96.2 was obtained.

Example 7.—$a,a'$-Diamino-p-xylene

A mixture of 1.011 grams of finely pulverized $a,a'$-dichloro-p-xylene, and liquid ammonia (mol ratio of ammonia: dihalide, 500:1) was agitated in a closed vessel for one hour at a temperature of 30° C. The resulting product contained 1.1191 grams of $a,a'$-diamino-p-xylene hydrochloride, which corresponds to a yield of about 92.5%, based on the quantity of dihalide initially introduced.

The reaction mixture obtained in the reaction of the dihalide with ammonia in accordance with the invention generally contains the desired diprimary diamine hydrohalide as the chief reaction product. The liquid ammonia, in large scale operations, is of course repeatedly recycled after being purged of the diprimary diamine hydrohalide. The diprimary diamine can be separated by any suitable method, such as by evaporating the ammonia and distilling the residue after neutralizing it by addition of alkali. When the amine hydrohalide is relatively insoluble in liquid ammonia, it can be separated in the form of a precipitate. The entire process may be operated either batch wise or continuously.

Since the dihalides with which this process is concerned are very reactive, the time of reaction is relatively short in comparison with the previously known processes for ammonolysis of dihalides. Thus with $a,a'$-dichloro-p-xylene as the dihalide reactant, the reaction is generally about 98% complete in 40 minutes, at a temperature of 30° C.; of course, with different compounds the rate of reaction will vary over a considerable range. It is permissible, but generally not necessary, to allow the reaction to proceed for 12 to 24 hours or longer in order to get maximum yields of the diamine. However, in the main the reaction is complete or essentially so in a surprisingly short reaction time, e. g. a reaction time of about 70 minutes or less.

While in the examples two methods have been disclosed for isolating the diamine formed by the process of this invention, it is, of course, to be understood that the invention is not restricted to the method of separating the product from the reactants. Other isolation procedures, commonly known in the art, may be used to separate the diamines from the mixtures obtained in the practice of the invention.

The diamines formed by the process of this invention are very useful for the preparation of synthetic linear polyamides. Examples of the processes by which such polymers can be prepared from diamines are described in U. S. Patents 2,071,251 and 2,130,523 to Carothers.

Since many different embodiments of the invention can be made without departing from the spirit and scope thereof, it is to be understood that we do not limit ourselves except as set forth in the following claims.

We claim:

1. A process for the synthesis of diprimary diamines which comprises reacting ammonia in the liquid phase under anhydrous conditions with a dihalohydrocarbon, having not more than 12 carbon atoms per molecule, in which both halogen atoms are of the class consisting of chlorine and bromine, each of the said halogen atoms being separated by a methylene group from an aromatic nucleus, at a temperature of 0° to 200° C., the initial mol ratio of ammonia to the said dihalides being at least 250:1, and thereafter separating the diprimary diamine from the resultant product.

2. A process for the synthesis of diprimary diamines which comprises reacting ammonia in the liquid phase under anhydrous conditions with a dihalohydrocarbon, having not more than 12 carbon atoms per molecule, in which both halogen atoms are of the class consisting of chlorine and bromine, each of the said halogen atoms being separated by a methylene group from an aromatic nucleus, at a temperature of 30° to 60° C., the initial mol ratio of ammonia to the said dihalide being at least 250:1, and thereafter separating the diprimary diamine from the resultant product.

3. A process for the synthesis of diprimary diamines which comprises reacting ammonia in the liquid phase under anhydrous conditions with a dihalohydrocarbon, having not more than 12 carbon atoms per molecule, in which both halogen atoms are of the class consisting of chlorine and bromine, each of the said halogen atoms being separated by a methylene group from an aromatic nucleus, at a temperature of 30° to 60° C., the initial mol ratio of ammonia to the said dihalide being in the range of 500:1 to 1200:1, and thereafter separating the diprimary diamine from the resultant product.

4. A process for the synthesis of diprimary diamines which comprises reacting ammonia in the liquid phase under anhydrous conditions with a dihalohydrocarbon, having not more than 12 carbon atoms per molecule, in which both halogen atoms are of the class consisting of chlorine and bromine, each of the said halogen atoms being separated by a methylene group from an aromatic nucleus, in the presence of an inert organic solvent at a temperature of 30° to 60° C., the initial mol ratio of ammonia to the said dihalide being in the range of 500:1 to 1200:1, and thereafter separating the diprimary diamine from the resultant product.

5. The process of claim 4 in which the said dihalide is $a,a'$-dichloro-p-xylene.

6. The process of claim 4 in which the said dihalide is $a^1,a^5$-dichlorodurene.

7. A process for the synthesis of diprimary diamines which comprises reacting ammonia in the liquid phase under anhydrous conditions with a dihalohydrocarbon, having not more than 12 carbon atoms per molecule, in which both halogen atoms are of the class consisting of chlorine and bromine, each of the said halogen atoms being separated by a methylene group from an aromatic nucleus, at a temperature of 30° to 60° C., the initial mol ratio of ammonia to the said dihalide being from 250:1 to 1200:1, for a reaction period not exceeding 70 minutes, whereby a hydrohalide of a diprimary diamine is produced as the chief reaction product, and thereafter separating the said diprimary diamine from the resulting mixture.

8. A process for the synthesis of $a^1,a^4$-diaminohexamethyl benzene which comprises reacting ammonia in the liquid phase under anhydrous conditions with $a^1,a^4$-dichlorohexamethyl benzene at a temperature of 30° to 60° C., the initial mol ratio of ammonia to $a^1,a^4$-dichlorohexamethyl benzene being from 250:1 to 1200:1 for a reaction period not exceeding 70 minutes, whereby a hydrohalide of $a^1,a^4$-diaminohexamethyl benzene is produced as the chief reaction product, and thereafter separating the said $a^1,a^4$-diaminohexamethyl benzene from the resulting mixture.

DE LOS F. DE TAR.
CHARLES J. LE POME.

References Cited in the file of this patent

UNITED STATES PATENTS

| Number | Name | Date |
|---|---|---|
| 2,072,015 | Tamele et al. | Feb. 23, 1937 |
| 2,113,640 | Barbieri et al. | Apr. 12, 1938 |
| 2,172,822 | Tamele et al. | Sept. 12, 1939 |
| 2,216,548 | Converse | Oct. 1, 1940 |
| 2,411,142 | Kelso et al. | Nov. 19, 1946 |

FOREIGN PATENTS

| Number | Country | Date |
|---|---|---|
| 482,008 | Great Britain | Mar. 22, 1938 |

OTHER REFERENCES

Strassman: "Ber. deut. chem.," vol. 21, pp. 576–581 (1888).

Landau: "Ber. deut. chem.," vol. 25, pp. 3011–3018 (1892).